Jan. 29, 1952     E. S. GRILLEY     2,583,643
FOLDING FRONT SECTIONS FOR TRAILER BODIES
Filed April 7, 1949     3 Sheets-Sheet 1
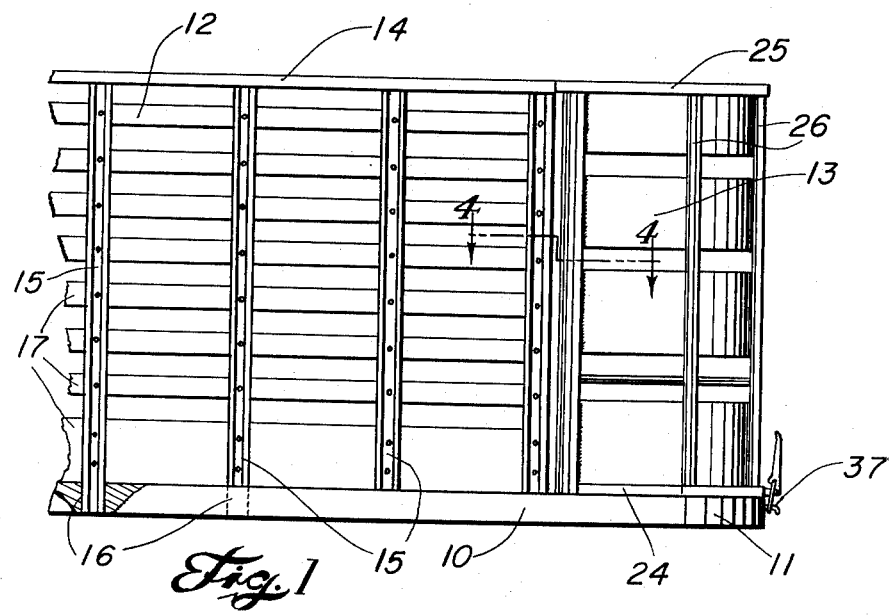
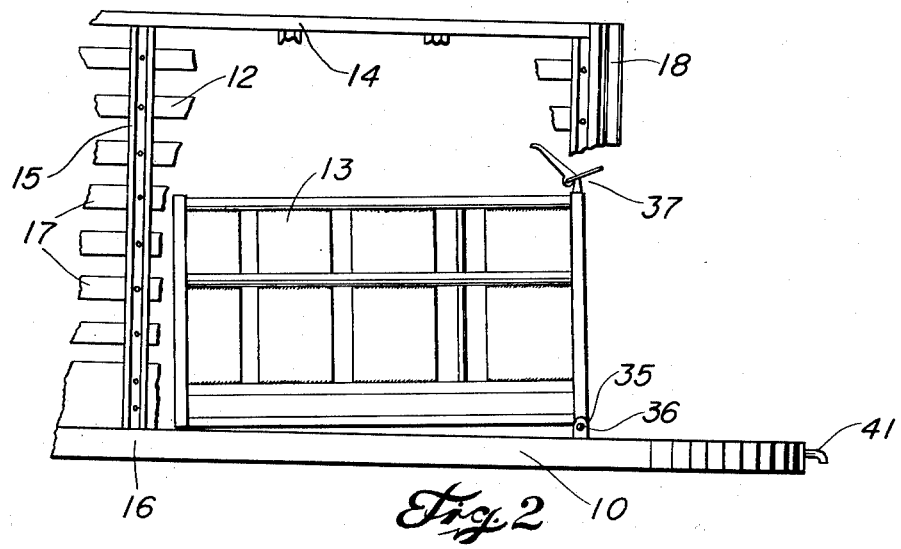
Inventor
Edmund S. Grilley
By Ahley & Ahley
Attorneys Jan. 29, 1952  E. S. GRILLEY  2,583,643
FOLDING FRONT SECTIONS FOR TRAILER BODIES
Filed April 7, 1949  3 Sheets-Sheet 2

Inventor
Edmund S. Grilley

By Ahley & Ahley
Attorneys

Jan. 29, 1952　　　　　E. S. GRILLEY　　　　　2,583,643
FOLDING FRONT SECTIONS FOR TRAILER BODIES
Filed April 7, 1949　　　　　　　　　　　3 Sheets-Sheet 3
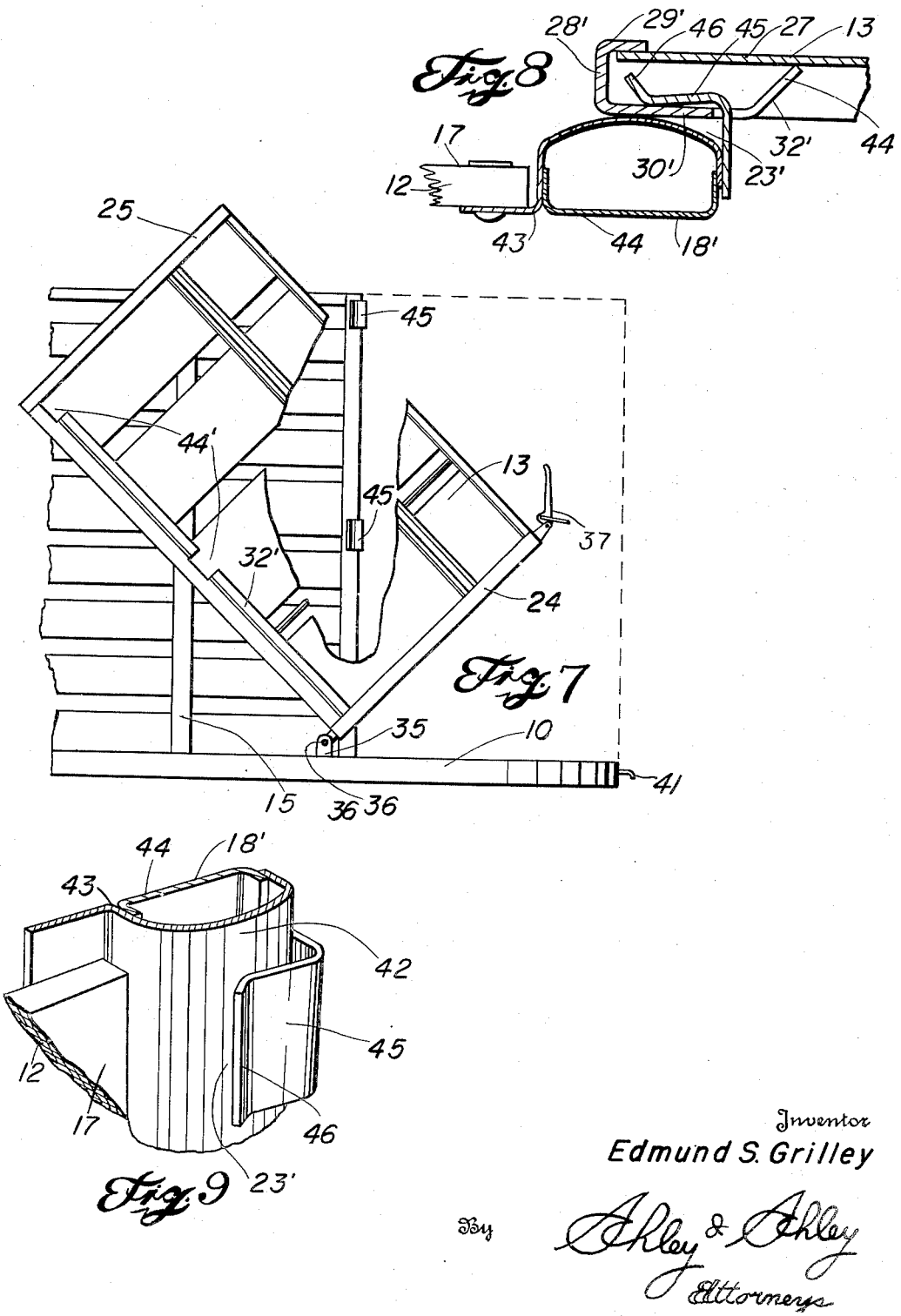
Inventor
Edmund S. Grilley
By Ashley & Ashley
Attorneys Patented Jan. 29, 1952

2,583,643

UNITED STATES PATENT OFFICE 2,583,643

FOLDING FRONT SECTION FOR TRAILER BODIES

Edmund S. Grilley, Fort Worth, Tex., assignor to Hobbs Manufacturing Company, Fort Worth, Tex., a corporation of Texas Application April 7, 1949, Serial No. 86,050

8 Claims. (Cl. 296—28)

This invention relates to new and useful improvements in folding front sections for trailer bodies.

One object of the invention is to provide an improved trailer body of the open or slatted type, particularly adapted to use on farms and ranches and having a folding front section which may be folded down onto the bed to reduce wind resistance and having means for attaching its rear vertical edges to the forward edges of the side sections of the body, in a new and novel manner.

A further object of the invention is to provide a trailer body having upright socket members at the forward ends of the side sections and a front section hinged on the bed having members at its rear upright edges interengaging the socket members, whereby the front and side sections are adequately secured to each other and the joints therebetween are sufficiently stiff to efficiently sustain the side thrusts of the load carried within the body.

A further object of the invention is to provide an improved joint between the vertical ends of the side and front sections of a trailer body having a socket and a member engaging in said socket in such a manner that the sections are not only securely connected, but are easily engaged and disengaged and braced against lateral distortion.

A construction designed to carry out the invention will be hereinafter described together with other features of the invention.

Figure 3:
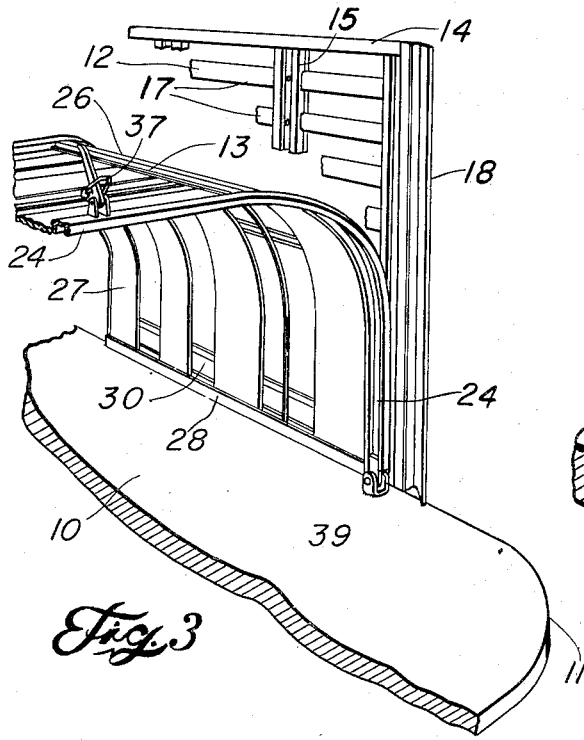
Figure 5:
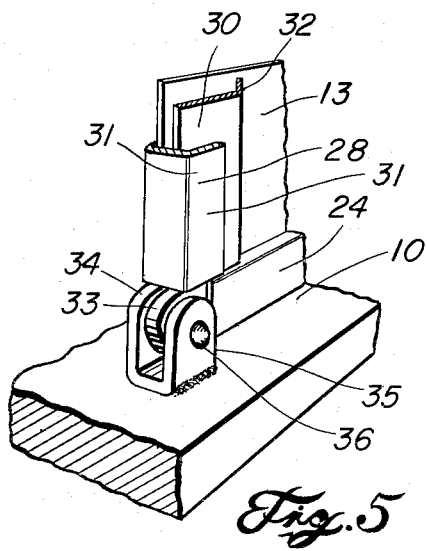
Figure 4:
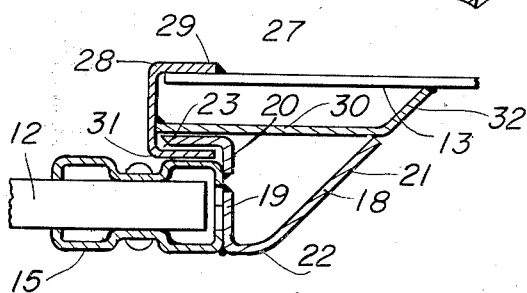
Figure 6:
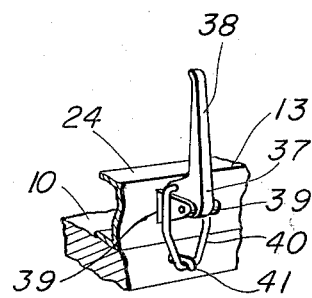

The invention will be more readily understood from a reading of the following specification and by reference to the accompanying drawings, wherein examples of the invention are shown, and wherein:

Fig. 1 is a side elevation of a portion of a trailer body constructed in accordance with the invention, Fig. 2 is a similar view, the front section being folded down upon the trailer bed and a portion of the side section being omitted, Fig. 3 is a perspective view of the forward portion of the body with the front section folded onto the bed, Fig. 4 is an enlarged transverse sectional view taken on the line 4—4 of Fig. 1, Fig. 5 is a perspective view showing one of the hinge mountings and portions of the bed and front section, Fig. 6 is a perspective view showing one of the latches, Fig. 7 is a view of the front portion of a trailer body showing a modified form of the invention with the front section in an intermediate position, one of the side sections being omitted, Fig. 8 is an enlarged horizontal cross-sectional view illustrating one of the joints between the sections, and Fig. 9 is an isometrical view looking at the inner side of one of the socket members.

In the drawings the numeral 10 designates the bed of an ordinary motor vehicle trailer which may be of any suitable construction and usually has a substantially flat upper surface or floor. The forward or front end of the bed has rounded corners 11. One type of trailer which is in common use for transporting cattle has upstanding slatted body walls and an open top. The front wall or section is usually made to conform to the shape of the front end of the bed 10, and it is customary to hinge these front sections so that they may be folded down onto the bed of the trailer in order to reduce wind resistance when the trailer is empty and is being hauled from place to place.

I have shown in the drawings standard side sections 12 and a folding front section 13. Since the invention has to do with the elements involved in the folding arrangement, it is obvious that the sections may have any suitable general construction with which the invention is usable. The side sections 12 each include the usual cap rail 14 secured on the upper ends of stakes or side posts 15 which have their lower ends projecting and engaging in sockets 16 in the marginal side portions of the bed whereby the section is removable. Slats or side boards 17 are secured to the inner faces of the stakes. Each side section has at its forward end an upright post or socket member 18 which is clearly shown in Figs. 1, 2, 3 and 4.

Each socket member includes an upright transverse web 19, a rearwardly directed vertical flange or clip 20 at the inner end of the web, and a forwardly directed and inwardly bent vertical wing 21 at the outer vertical edge of said web, as is best shown in Fig. 4. It is preferable to make each socket member from a thin metal strip and to bend the same longitudinally to form the elements thereof. It will be noted that the flange 20 is bent sharply from the inner edge of the web 19 and at substantially right angles thereto; while the wing 21 is more gradually bent so as to provide a rounded nose 22 and thus prevent a sharp edge as is customary in this art. The rear face of each web 19 is welded or otherwise secured to the flat front vertical edge of the front stake 15 of each of the side sections 12, and in such a manner that the flange 20 is spaced from the inner side of the adjacent stake to provide a vertical socket 23 therebetween. The inner edge of the wing 21 terminates in substantially the same vertical plane as the inner face of the flange 20.

The front section is made up of a bottom rail or member 24 and a cap rail or member 25, both of complimentary shape, and conforming to the contour of the front end of the trailer bed 10. The rails 24 and 25 are connected by upright stakes or posts 26. It is customary to make these elements of channel shape in cross-section which lends strength and stability. The members 24 and 25 have their flat sides facing outwardly and the stakes are welded or otherwise secured to said members in any suitable manner. Slats 27 are secured to the inner sides of the stakes and, of course, conform to the general shape of the front section.

The front section has at each inner end a vertical channel or end member 28 with its legs or flanges facing forwardly so that the rear ends of the slats 27 may be received in the channels against the inner faces of the inner legs 29 and welded thereto. Upright guide panels or members 30 have their rear edges welded to the inner faces of the channels and spaced from the outer legs or flanges 31 thereof. The panels are disposed in substantially parallel relation to the slats 13 and have their forward ends 32 bent inwardly and welded to the outer faces of the slats. As shown in Fig. 4, it is preferable to bend the ends 32 at the same angle as the wings 21 so as to give a symmetrical appearance. The legs or flanges 31 of the channels 28 engage in the sockets 23 when the front section is folded down or forwardly into its operative position.

As is best shown in Fig. 5, the rear ends of the bottom rail 24 are provided with rearwardly projecting eye members 33 which underlie the lower end of each channel 28. These eye members are received between the upstanding ears 34 of U-shaped brackets 35 welded on the surface of the trailer bed 10 and disposed adjacent the bases of the forward stakes 15 at the inner front portions thereof. The members 33 are hinged in the brackets on pins 36 whereby the front section 13 is hinged to the floor of the trailer so that it may be swung upwardly, rearwardly between the side sections 12 and rested on the floor of the bed 10. The pins 36 are so positioned that when the front section is folded upwardly and forwardly the flanges 31 will engage in the sockets 23, whereby both the rear vertical portions of the front sections and the forward ends of the side sections are connected and braced against spreading or distortion.

When the front section 13 is folded forwardly into operative position as shown in Fig. 1, the inner edges of the wings 21 act as guides so that if the side portions of the front section are laterally out of line, the angular ends 32 of the panels 30 will engage the inner vertical edges of said wings, whereby the front section will be centered and the flanges 31 caused to properly enter the sockets 23. While any suitable means may be provided for fastening the front section down upon the bed 10, I prefer to use one or more latches indicated generally by the numeral 37, one of said latches being illustrated in detail in Fig. 6. The latch includes a hand lever 38 pivoted in a bracket 39, secured to the front side of the bottom rail 24. The lever has a hasp 40 eccentrically pivoted thereto and adapted to engage under a keeper hook 41 on the front edge of the bed 10. The hasp, being eccentrically pivoted inwardly of the pivot of the lever, will tightly fasten the front section to the bed and hold the lever in latched position when the latter is swung upwardly, as is shown in Fig. 6. When it is desired to fold back the front section 13, it is merely necessary to release the latch 37 and swing the section 13 upwardly and rearwardly between the socket members 18 until the channel members 28 rest on the floor of the bed 10 between the side sections 12, as is shown in Figs. 2 and 3. In this position the front section will be substantially streamlined with respect to the forward travel of the trailer.

In Figs. 7, 8 and 9, I have shown a slightly modified form of construction embodying the invention. Instead of the socket member 18, I provide an upright post or socket and stiffener member 18' which is generally tubular in shape and has a curved inner wall 42 and a rearwardly directed vertical flange 43 substantially parallel with its outer wall 44. The slats 17 are suitably secured to the inner side of the flange. It is to be understood that in this description the members 18 and 18' may be referred to as posts or socket members or stiffener members. It is obvious that these members must be made stout enough to take the side thrust when the load is shifted against the channels 28 and 28'.

In this form the channels or end members 28' are slightly different from the channels 28. Instead of the flange 31 and the panel 30 being separate, the flange is extended forwardly to form a panel 30' and the wing portion or inwardly bent end 32' is provided with slots 44' which extend rearwardly into the panel. Clips or flanges 45 are secured to the forward edges of the members 18' and spaced therefrom to form sockets 23'. Each clip is bent at substantially right angles and directed rearwardly so as to overlie the curved walls 42, as is shown in detail in Figs. 7 and 9. Each clip has an inwardly directed inclined bill 46 which acts to guide the clips into the slots 44' when the front section is swung forwardly, whereby the panels are received in the sockets 23'. The front section 13 may be fastened by the latch 37 or in any other suitable manner. The clips and slots are vertically spaced at suitable intervals.

It will be noted that the clips 45 are made of relatively thin metal and thus, may be resilient. Each clip is bent toward the rounded face 42 and when the front section is swung upwardly and forwardly each panel 30' will engage said rounded face and be guided into the adjacent clip, slightly springing the same and frictionally engaging in the socket 23'.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A trailer body including, an elongate floor, upright longitudinal side sections mounted along each side of said floor having upright front ends, socket members at the front ends of the side sections disposed vertically thereof, a normally upright transversely bowed front end section having its lower rear ends hinged to the floor adjacent the front ends of the side sections, said front section being adapted to be folded down onto the floor between the side sections and to be swung to an upright position, and clips along the rear edges of the front section engaging the socket members when the front section is swung to an upright position.

2. A trailer body including, an elongate floor, upright longitudinal side sections mounted along each side of said floor having upright front ends, upright posts secured to the front ends of the side sections, a clip carried by each post and forming therewith an open socket, a normally upright transversely bowed front end section hinged at its lower rear ends to the floor adjacent the front ends of the side sections adapted to fold down rearwardly to the floor between said side sections, and at least one member on each rear edge of the front section receiving the clip and engaging in the socket at each post when the front section is swung to an upright position.

3. A trailer body including, an elongate floor, upright longitudinal side sections mounted along each side of said floor having upright front ends, upright posts secured to the front ends of the side sections, a clip carried by each post and forming therewith an open socket, a normally upright transversely bowed front end section hinged at its lower rear ends to the floor adjacent the front ends of the side sections and adapted to fold down rearwardly to the floor between said side sections, upright channels along the rear edges of the front section receiving therein the clips when the front section is swung to its upright normal position.

4. A trailer body including, an elongate floor, upright longitudinal side sections mounted along each side of said floor having upright front ends, upright posts secured to the front ends of the side sections, rearwardly directed open clips spaced along the posts, a normally upright transversely bowed front end section hinged at its lower rear ends to the floor adjacent the posts adapted to fold down rearwardly to the floor between said side sections and having vertical rear edges, and a channel secured along each vertical rear edge of the bowed section receiving along its outer side one of the clips.

5. A trailer body including, an elongate floor, upright longitudinal side sections mounted along each side of said floor having upright front ends, upright posts at the forward ends of the side sections each comprising a transverse web having an inwardly directed wing at its outer edge and a rearwardly directed clip at its inner edge spaced from the adjacent side section to form a socket therebetween, a normally upright transversely bowed front end section having its lower rear ends hinged to the floor adjacent the posts, said front section being adapted to be swung down onto the floor between the side sections and to be swung to an upright position, and channels along the rear edges of the front end section having flanges engaging in the sockets when said front section is swung up to an upright position.

6. A trailer body including, an elongate floor, upright side sections mounted along each side of the floor having upright front ends, upright posts at the forward ends of the side sections each post comprising a transverse web having an inwardly directed wing at its outer edge and a rearwardly directed clip at its inner edge spaced from the side of the adjacent section to form a socket therebetween, a normally upright transversely bowed front end section having its lower rear ends hinged to the floor adjacent the front ends of the side sections, upright channels secured to the rear vertical edges of the front section having flanges and panels with their rear edges secured in the channels and their front edges secured to the front section, the clips of the socket members being received between the panels and the flanges of the channels, the front section being disposed to be swung rearwardly and downwardly onto the floor between the side sections, whereby the panels and the flanges are withdrawn from the clips.

7. A trailer body including, an elongate floor, upright side sections mounted longitudinally along each side of the floor having upright front ends, upright members secured to the front ends of the side sections, clips spaced vertically on the upright members and directed rearwardly with respect to the inner walls of the upright members to form sockets therebetween, and a normally upright transversely bowed front end section having its lower rear ends hinged to the floor adjacent the upright members and provided with upright transversely slotted members at its rear ends receiving the clips when said section is swung up to an upright position and disengaging from said clips when swung down and rearwardly between the side sections.

8. A trailer body as set forth in claim 7, wherein the inner vertical face of each upright member is transversely rounded and each clip is resilient and is close to said face, whereby the panels of the front section may be frictionally engaged therebetween.

EDMUND S. GRILLEY.

REFERENCES CITED

The following references are of record in the file of this patent:

UNITED STATES PATENTS

| Number | Name | Date |
|---|---|---|
| 1,093,574 | Heinz et al. | Apr. 14, 1914 |

FOREIGN PATENTS

| Number | Country | Date |
|---|---|---|
| 397,967 | Great Britain | Sept. 7, 1933 |
| 666,104 | Germany | Oct. 12, 1938 |